(12) United States Patent
Chang

(10) Patent No.: US 7,498,764 B2
(45) Date of Patent: Mar. 3, 2009

(54) CONTROL DEVICE FOR DRIVING REGULATING MOTOR

(75) Inventor: Yen-Chih Chang, Taichung Hsien (TW)

(73) Assignee: Rexon Industrial Corporation Ltd., Taichung Hsien (TW)

( * ) Notice: Subject to any disclaimer, the term of this patent is extended or adjusted under 35 U.S.C. 154(b) by 280 days.

(21) Appl. No.: 11/600,767

(22) Filed: Nov. 17, 2006

(65) Prior Publication Data

US 2008/0115642 A1    May 22, 2008

(30) Foreign Application Priority Data

Nov. 17, 2006    (TW) .............................. 94219929 U

(51) Int. Cl.
    *H02P 3/00*    (2006.01)
(52) U.S. Cl. .................. 318/782; 318/549; 307/139
(58) Field of Classification Search ................. 318/782, 318/549, 459, 762, 551, 16, 17; 307/125, 307/126, 139–142; 173/13, 15, 20; 30/276, 30/382
See application file for complete search history.

(56) References Cited

U.S. PATENT DOCUMENTS

| 4,258,368 | A | * | 3/1981 | Arnold et al. ............... 318/782 |
| 4,658,507 | A | * | 4/1987 | Hazen .......................... 30/382 |
| 6,014,813 | A | * | 1/2000 | Merino ........................ 30/391 |
| 6,943,510 | B2 | * | 9/2005 | Gorti .......................... 318/275 |
| 7,211,972 | B2 | * | 5/2007 | Garcia et al. .................. 318/16 |

* cited by examiner

*Primary Examiner*—Rajnikant B Patel
(74) *Attorney, Agent, or Firm*—Browdy and Neimark, P.L.L.C.

(57) ABSTRACT

A control device for driving a regulating motor driven by direct current (DC) includes a changeover mechanism having a first normally closed (NC) switch, a second NC switch, a first normally open (NO) switch, and a second NO switch, a power-supply module for providing DC for the regulating motor, a first operating switch for driving the regulating motor to rotate in a first direction while the two NC switches become open circuit and the two NO switches become short-circuit resulting from that the first operating switch is short-circuit, and a second operating switch for driving the regulating motor to rotate in a second direction opposite to the first direction. In light of these, the control device can control the rotational direction of the regulating motor by means of simple circuitry.

19 Claims, 5 Drawing Sheets

CONTROL DEVICE FOR DRIVING REGULATING MOTOR

BACKGROUND OF THE INVENTION

1. Field of the Invention

The present invention relates to a control device for driving a regulating motor, and more particularly, the control device can control the rotational direction of the regulating motor.

2. Description of the Related Art

Among the conventional woodworking machines, for example, table saw, only a saw blade is driven to work by an electric motor, and other operations, like adjustment of the cutting height and angle of the saw blade, are done manually. Such manual adjustment is done generally by turning a hand wheel located outside the table saw; and then rotating the screw rod having an end fixed to a center of the hand wheel and further moving a saw base engaging with the screw rod by its thread and coupled with the saw to synchronously move the saw. However, such mechanical operation is laborious and takes more time to adjust the saw to the predetermined position, thus being inconvenient.

SUMMARY OF THE INVENTION

The objective of the present invention is to provide a control device for driving a regulating motor, and further the control device can control the rotational direction of the regulating motor. Furthermore, when the control device and the regulating motor are applied to a table saw mechanism, the position of a saw blade of the table saw mechanism can be adjusted electrically.

For attaining the foregoing objective, the control device includes a changeover mechanism, a power-supply module, a first line, a second line, a third line, a fourth line, a first operating switch, and a second operating switch. The regulating motor is driven by direct current (DC), having a rotational shaft and two power terminals. The changeover mechanism includes a first normally closed (NC) switch, a second NC switch, a first normally open (NO) switch, and a second NO switch. The power-supply module provides the DC for the regulating motor. The first line connects with the power-supply module and one of the two power terminals of the regulating motor, and the first NO switch is serially connected in it. The second line connects with the power-supply module and the other power terminal, and the first NC switch is serially connected in it. Both of the first and second lines connect with the same one polarity of the power-supply module. The third line connects with the power-supply module and the power terminal that the first line connects with, and the second NC switch is serially connected in it. The fourth line connects with the power-supply module and the power terminal that the second line connects with, and the second NO switch is serially connected in it. Both of the third and fourth lines connect with the other polarity of the power-supply module.

When the first operating switch is short-circuit, the two NC switches become open-circuit and the two NO switches become short-circuit to drive the rotational shaft of the regulating motor to rotate in a first direction. The second operating switch is to drive the rotational shaft of the regulating motor to rotate in a second direction opposite to the first direction.

In light of the above structure, the user only needs to operate the first and second switches to control the rotational direction of the rotational shaft of the regulating motor. That is simple and convenient.

DETAILED DESCRIPTION OF PREFERRED EMBODIMENTS

Figure 1:
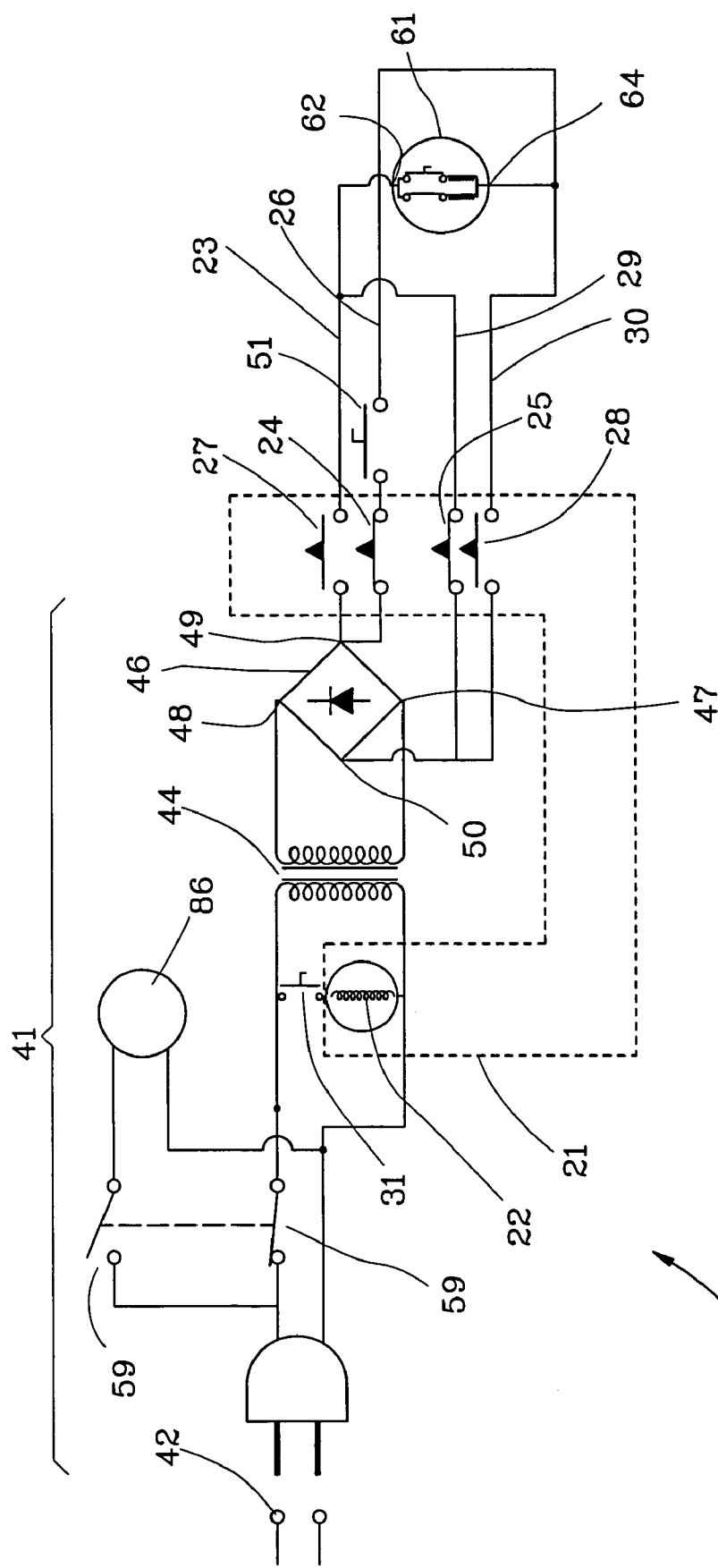
FIG. 1 is a circuit diagram of a control device in a first embodiment of the present invention.

Referring to FIGS. 1, a control device 10 for driving a regulating motor 61, constructed according to a first embodiment of the present invention, includes a changeover mechanism 21, a first line 23, a second line 26, a third line 29, a fourth line 30, a first operating switch 31, a power-supply module 41, and a second operating switch 51. The regulating motor 61 is driven by the DC power and has a rotational shaft (not shown) and two power terminals 62 and 64.

The changeover mechanism 21 includes a first normally closed (NC) switch 24, a second NC switch 25, a first normally open (NO) switch 27 and a second NO switch 28, and has the ability to switch the switches 24, 25, 27 and 28. In present art, a processor or a relay is good to fulfill the task of switch. This embodiment selects the relay to accomplish the invention. In other words, the changeover mechanism 21 further includes a relay 22.

The power-supply module 41 includes an alternating current (AC) power 42, a transformer 44, and a rectifier 46. The rectifier 46, for example, a bride rectifier, has two opposite terminals 47 and 48 and two polarities defined as an anode output terminal 49 and a cathode output terminal 50 in this embodiment. The transformer 44 has a primary side two ends of which connect with the AC power 42 and a secondary side two ends of which connect with the two opposite terminals 47 and 48 respectively. Accordingly, alternating current from the AC power 42 is converted into direct current (DC) to be provided for the regulating motor 61 through the anode and cathode output terminals 49 and 50.

The first line 23 connects with the first power terminal 62 of the regulating motor 61 and the anode output terminal 49 of the rectifier 46, and the first NO switch 27 is serially connected in it. The second line 26 connects with the second power terminal 64 of the regulating motor 61 and the anode output terminal 49 of the rectifier 46, and the first NC switch 24 is serially connected in it. The third line 29 connects with the first power terminal 62 of the regulating motor 61 and the cathode output terminal 50 of the rectifier 46, and the second NC switch 25 is serially connected in it. The fourth line 30 connects with the second power terminal 64 of the regulating motor 61 and the cathode output terminal 50 of the rectifier 46, and the second NO switch 28 is serially connected in it.

Figure 2:
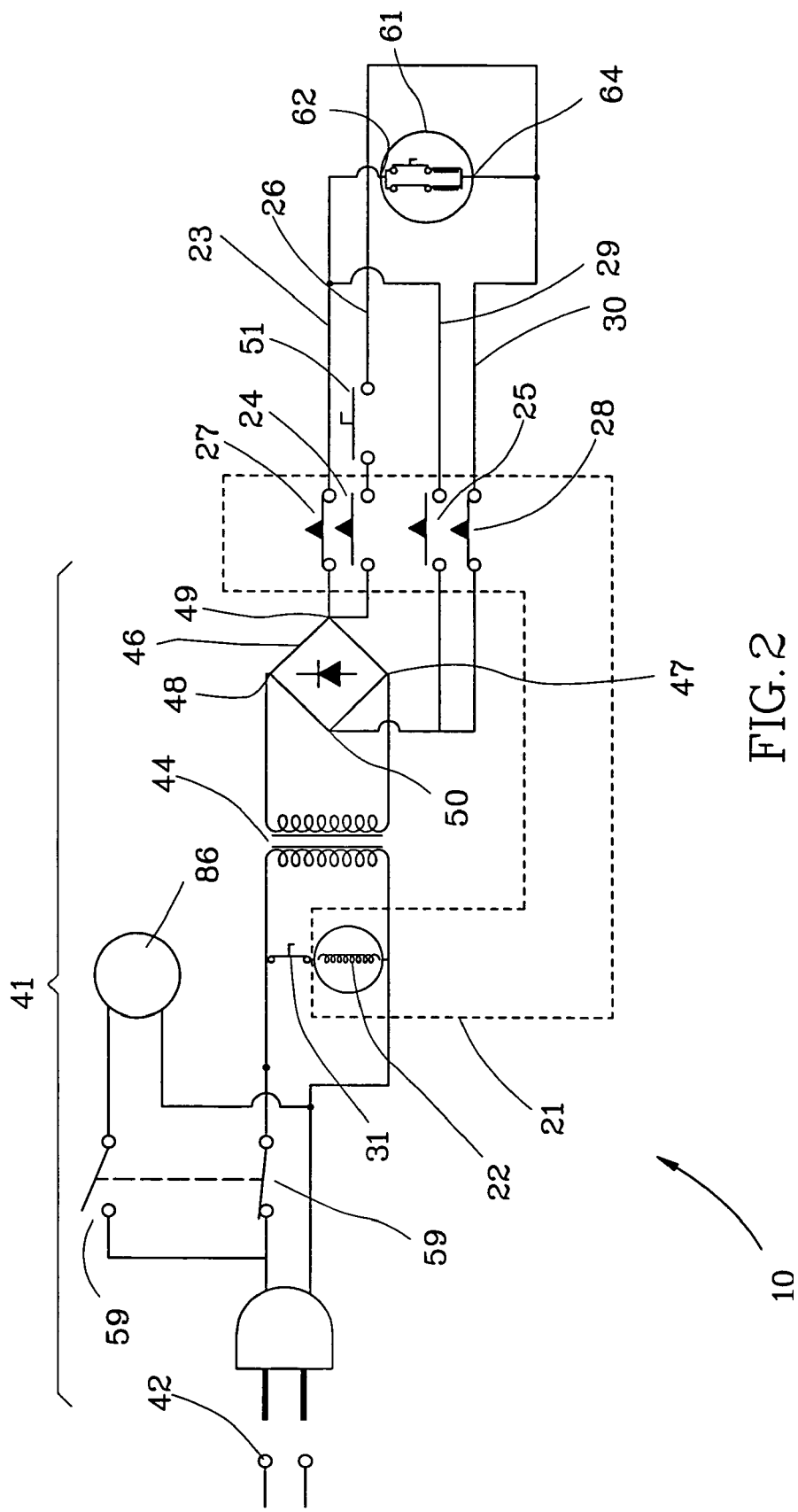
FIG. 2 is a circuit diagram of the control device in operation in the first embodiment of the present invention.

The first operating switch 31 serially connects with the relay 22 for controlling whether the relay 22 is electrically conducted, and both of them 31,22 connect in parallel with the AC power 42 and the transformer 44. As shown in FIG. 2, when the first operating switch 31 is short-circuit to enable current pass the relay 22, the relay 22 enables the two NC switches 24,25 to be open-circuit and the two NO switches 27,28 to be short-circuit to bring electric conduction of a first circuit loop formed by the first and fourth lines 23 and 30, further driving the rotational shaft (not shown) of the motor 61 to rotate in a first direction.

Figure 3:
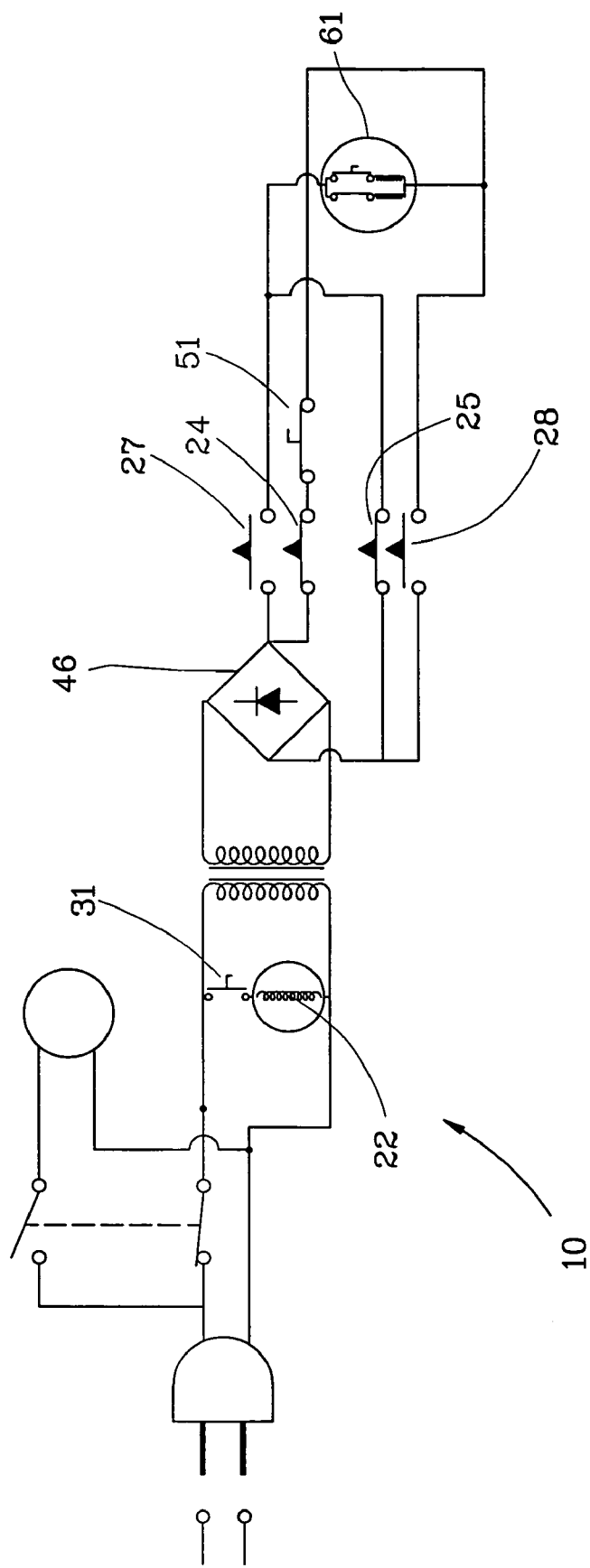
FIG. 3 is a circuit diagram of the control device in another operation in the first embodiment of the present invention in operation.

Referring to FIG. 1 again, the second operating switch 51 is serially connected in a second circuit loop formed by the second and third lines 26,29 for controlling whether the second circuit loop is electrically conducted. Therefore, the second operating switch 51 can be serially connected in the second line 26 as an illustrative example in this embodiment or the third line 29. As shown in FIG. 3, in general status, i.e. when the first operating switch 31 is open-circuit, the two NO switches 27 and 28 are open-circuit and the two NC switches 24 and 25 are short-circuit, causing that the first circuit loop is not electrically conducted. Under the general status, if the first operating switch 31 is kept in open circuit, the second circuit loop is electrically conducted to drive the rotational shaft of the motor 61 to rotate in a second rotational direction opposite to the first rotational direction while the second operating switch 51 is short-circuit.

As shown in FIG. 1, two buttons are applied to this embodiment to embody the first and second operating switches 31,51. When the first and second operating switches 31,51 have not been pressed, the two NO switches 27,28 are open-circuit and the first circuit loop is not electrically conducted. Meanwhile, although the two NC switches 24, 25 are short-circuit, the second operating switch 51 is open-circuit and the second circuit loop is not electrically conducted; thus, the motor 61 can not run. The control device further includes a safe design, i.e. when the first and second operating switches 31, 51 are pressed at the same time, the first operating switch 31 makes the two NO switches 27,28 short-circuit to enable electric conduction of the first circuit loop and makes the two NC switches 24,25 open-circuit. Therefore, the second operating switch 51 is though short-circuit, but the second circuit loop is still not electrically conducted.

Figure 4:
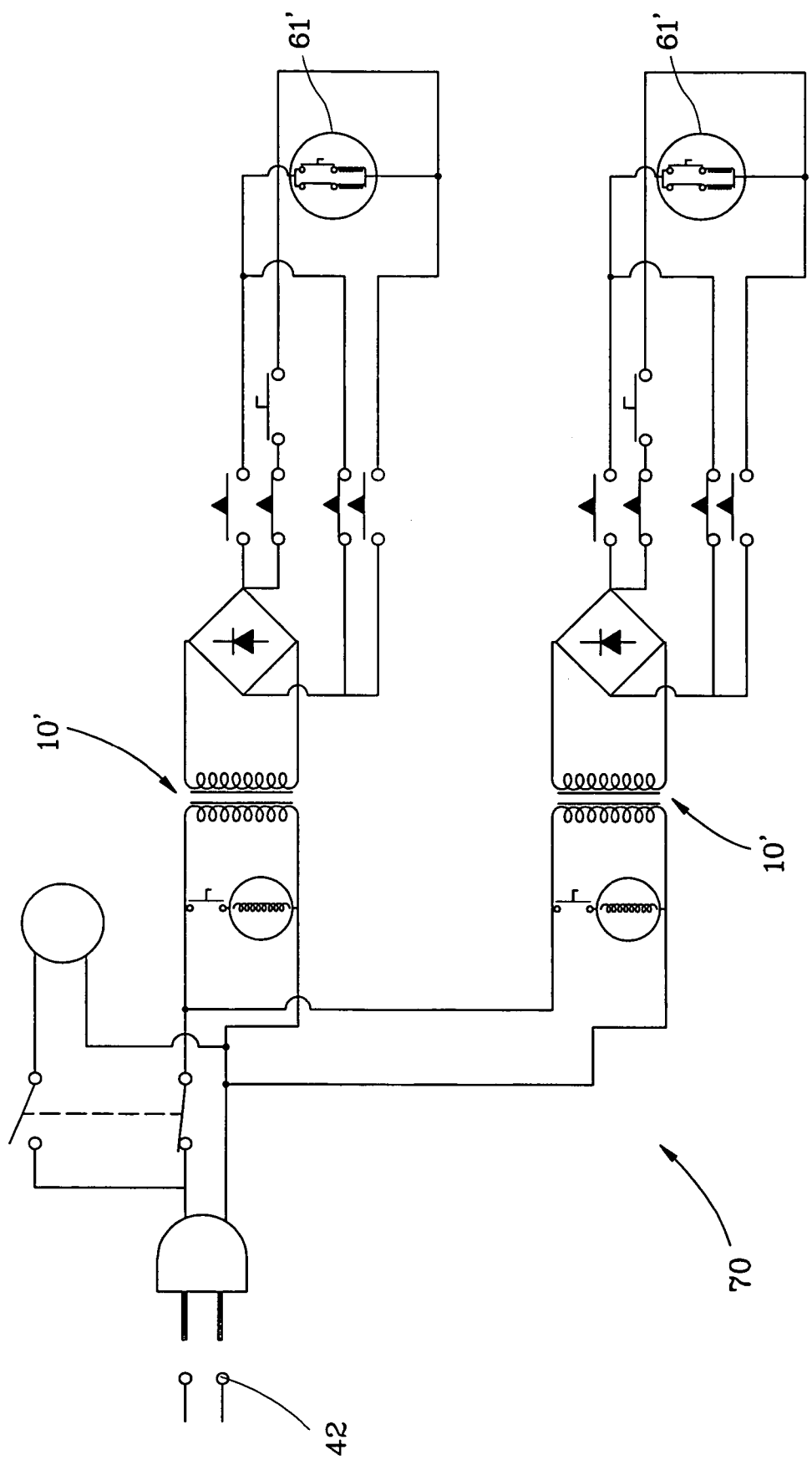
FIG. 4 is a circuit diagram of a control device in a second embodiment of the present invention.

Referring to FIG. 4, a control device 70 for driving two regulating motors 61', constructed according to a second preferred embodiment of the present invention, is similar to the control device 10 of the first embodiment but different as recited below.

The AC power 42 is the only one power source. The control device 70 is composed of two driving mechanisms 10' as well as the AC power 42. The two driving mechanisms 10' are each the same as the remaining component of the control device 10 except for the AC power 42, connects in parallel with the AC power 42 and connects with the two regulating motors 61' for controlling the rotational directions of the rotational shafts of the two motors 61' respectively.

Figure 5:
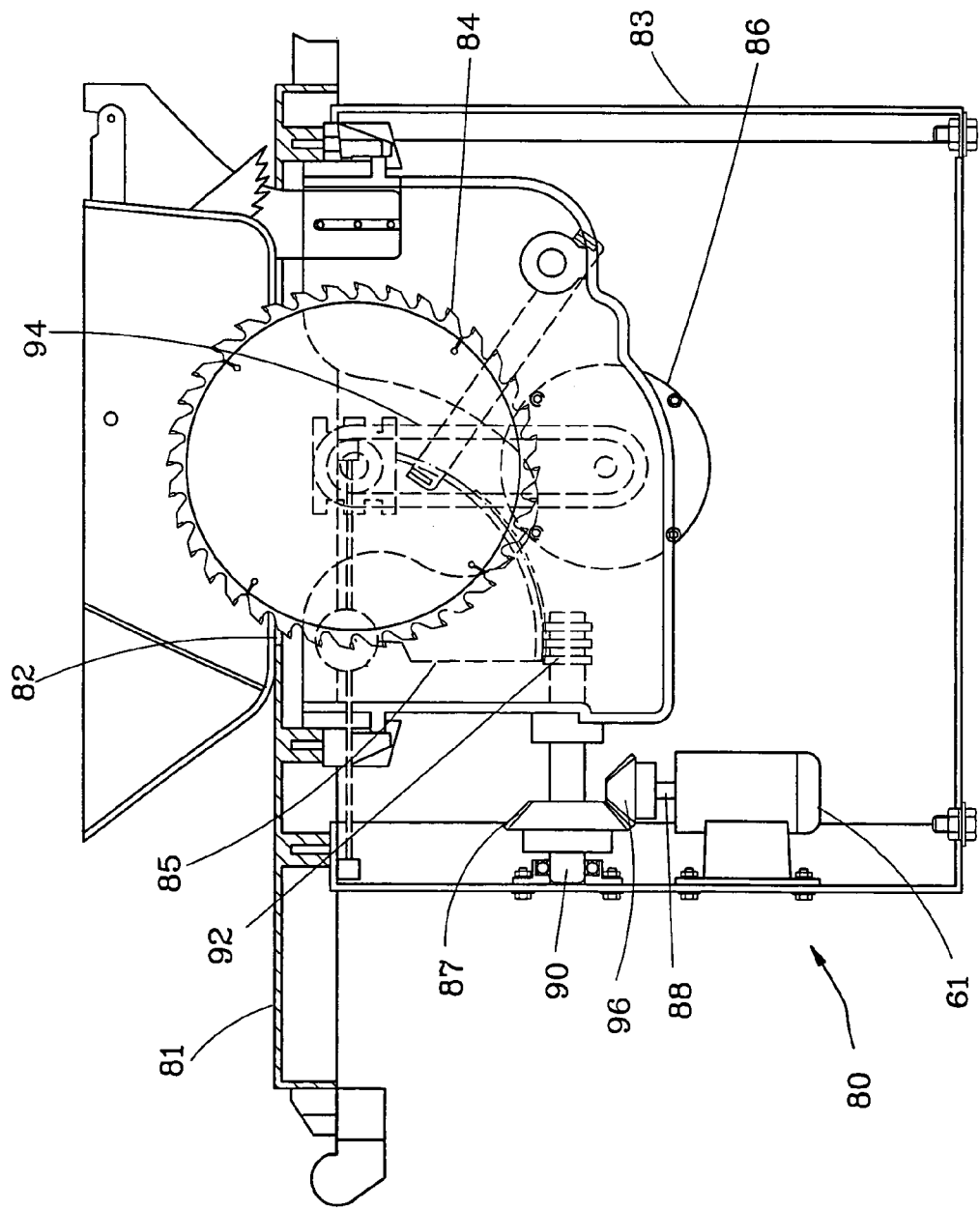
FIG. 5 is a schematic view of a table saw machine of the present invention.

Referring to FIG. 5, which illustrates that the control device 10 and the regulating motor 61 of the first embodiment of the present invention are applied to a table saw machine 80. The table saw machine 80 includes a bench 81, a base frame 83, a saw blade 84, a saw holder, the regulating motor 61, and the control device 10. The bench 81 is provided for carrying a workpiece (not shown), having a saw slot 82. The base frame 83 connects with the bench 81 for supporting the bench 81. The saw blade 84 can be adjusted to pass through the saw slot 82 for cutting the workpiece.

The saw holder is mounted in the base frame 83, including an adjustor and a motor 86. The adjustor has an arched rack 85, a first bevel gear 87, and a screw rod 90. The saw blade 84 is rotatably mounted to an end of the arched rack 85 and connected to a rotational shaft of the motor 86 through a belt 94 to enable the motor 86 drive the saw blade 84 to cut the workpiece. A thread 92 of the screw rod 90 engages the arched rack 85. The first bevel gear 87 is mounted to the screw rod 90, abutting a side of the base frame 83. The motor 61 is mounted on the side of the base frame 83, having a rotational shaft 88 and a second bevel gear 96. The second bevel gear 96 is mounted to the rotational shaft 88 and engages with the first bevel gear 87. In light of this structure, when the control device 10 drives the rotational shaft 88 of the regulating motor 61 to rotate, the rotational shaft 88 moves the second bevel gear 96, the first bevel gear 87, the screw rod 90, the thread 92, and the arched rack 85 in sequence to lastly make the saw blade 84 move.

Because the first and second operating switches 31 and 51 are adapted for controlling the rotational direction of the rotational shaft 88 of the motor 61, they are embodied as buttons shown outside the table saw machine 80 for the user's operation. When the user presses the first operating switch 31, the rotational shaft 88 rotates in the first direction. When the user releases the first operating switch 31 and then presses the second operating switch 51, the rotational shaft 88 rotates in the second direction, thus controlling upward and downward movement of the saw blade 84 relative to the bench 81.

Referring to FIG. 1 again, the motor 86 in application connects in parallel with the AC power 42 and the transformer 44 so as to be driven by the AC power 42. The control device 10 further includes a pair of linked switches 59, one of which is serially connected in a driving circuit connecting with the motor 86 for control if the motor 86 is driven and the other of which serially connects with the power-supply module 41 and is serially connected in a driving circuit connecting with the motor 61 for control if the motor 61 is driven. The two linked switches 59 are contrary to each other in changeover. In other words, when one of the linked switches is open-circuit, the other is short-circuit and vice versa. In light of this, the AC power 42 is switched to provide power for either of the motor 86 and the motor 61 to ensure only one of the motors 61 and 86 with the power at the same time.

The commercially available table saw machine at present, in addition to a height-adjusting assembly, includes an angle-adjusting assembly for the saw blade. The two assemblies each have a hand wheel located outside the table saw machine and a screw rod fixed to the center of the hand wheel. The adjustments of the height and angle of the saw blade are done manually through the two pairs of hand wheels and screw rods. If the user intends to change one of the manual adjusting assemblies to an electric one, the change can be done by applying the control device 10 and motor 61 of the first embodiment to the table saw machine. The control device 10 controls the rotational direction of the rotational shaft 88 of the motor 61 and further controls the rotational direction of the screw rod to achieve the adjustment of the saw blade. If the user intends to change both of the manual adjusting assemblies to electric ones, the change can be done by applying the control device 70 and the motor 61 of the second embodiment to the table saw machine.

In conclusion, the present invention includes the following advantages.

1. Few operating switches: the present invention applies the relay to switch the NC and NO switches so the user only needs to operate the first and second operating switches, thus causing operational convenience.
2. Safety: the present invention applies the first and second operating switches and the NC and NO switches to make the current not conducted through the first circuit loop and the second circuit loop at the same time.
3. Convenience: when the control device and the regulating motor are applied to the table saw machine, the saw blade can be electrically adjusted to improve the inconvenience of manual adjustment of the prior art.

Although the present invention has been described with respect to specific embodiments thereof, it is no way limited to the details of the illustrated structures but changes and modifications may be made within the scope of the appended claims.

What is claimed is:

1. A control device for driving a regulating motor which is driven by direct current (DC) and has a rotational shaft, a first power terminal and a second power terminal, said control device comprising:
   a changeover mechanism having a first normally closed (NC) switch, a second NC switch, a first normally open (NO) switch, and a second NO switch;
   a power-supply module for providing said regulating motor with DC power;
   a first line connecting said power-supply module and said first power terminal, and said first NO switch serially connected therein;
   a second line connecting with said power-supply module and said second power terminal, and said first NC switch serially connected therein, wherein said first and second lines connecting with the same one polarity of said power-supply module;
   a third line connecting with said power-supply module and said first power terminal, and said second NC switch serially connected therein;
   a fourth line connecting with said power-supply module and said second power terminal, and said second NO switch serially connected therein, wherein said third and fourth lines connecting with the other polarity of said power-supply module;
   a first operating switch for driving said rotational shaft of said regulating motor to rotate, wherein said rotational shaft rotates in a first direction while said two NC switches become open-circuit and said two NO switches become short-circuit resulting from that said first operating switch become short-circuit; and
   a second operating switch for driving said rotational shaft of said regulating motor to rotate in a second direction opposite to said first direction.

2. The control device as defined in claim 1, wherein said second operating switch is serially connected in one of said second and third lines, and said rotational shaft of said regulating motor is driven to rotate in the second direction when said first operating switch is open-circuit and said second operating switch is short-circuit.

3. The control device as defined in claim 1, wherein said power-supply module comprises an alternating current (AC) power, a transformer, and a rectifier, and said transformer has a primary side having two ends connecting with said AC power and a secondary side having two ends connecting with said rectifier.

4. The control device as defined in claim 3, wherein said first and second lines connect with the same one polarity of said rectifier, and said third and fourth lines connect with the other polarity of said rectifier.

5. The control device as defined in claim 3, wherein said rectifier is a bridge rectifier.

6. The control device as defined in claim 3, wherein said changeover mechanism has a relay for switching said first NC, second NC, first NO, and second NO switches.

7. The control device as defined in claim 6, wherein said first operating switch serially connects with said relay.

8. The control device as defined in claim 7, wherein said relay connects in parallel with said AC power and said transformer.

9. A table saw machine comprising:
   a bench having a saw slot, for carrying a workpiece;
   a base frame connecting with said bench for supporting said bench;
   a saw blade passing through said saw slot for cutting said workpiece;
   a saw holder mounted in said base frame, connecting with said saw blade and having an adjustor for moving said saw blade relative to said bench, and a saw motor for driving said saw blade;
   a regulating motor driven by DC power and having a rotational shaft for moving said adjustor so as to synchronously moving said saw blade, a first power terminal and a second power terminal; and
   a control device for controlling the rotational direction of said rotational shaft of said regulating motor and comprising:
      a changeover mechanism having a first NC switch, a second NC switch, a first NO switch, and a second NO switch;
      a power-supply module for providing said regulating motor with DC power;
      a first line connecting with said power-supply module and said first power terminal, and said first NO switch serially connected therein;
      a second line connecting with said power-supply module and said second power terminal, and said first NC switch serially connected therein, wherein said first and second lines connect with the same one polarity of said power-supply module;
      a third line connecting with said power-supply module and said first power terminal, and said second NC switch serially connected therein;
      a fourth line connecting with said power-supply module and said second power terminal, and said second NO switch serially connected therein, wherein said third and fourth lines connect with the other polarity of said power-supply module;
      a first operating switch for driving said rotational shaft of said regulating motor to rotate, wherein said rotational shaft rotates in a first direction while said two NC switches become open-circuit and said two NO switches become short-circuit resulting from that said first operating switch become short-circuit; and
      a second operating switch for driving said rotational shaft of said regulating motor to rotate in a second direction opposite to said first direction.

10. The table saw machine as defined in claim 9, wherein said adjustor comprises an ached rack.

11. The table saw machine as defined in claim 10, wherein said adjustor further comprises a first bevel gear and a screw rod, said first bevel gear mounted on said screw rod, and said screw rod having a thread engaging said arched rack, and wherein said regulating motor further comprises a second bevel gear mounted on said rotational shaft thereof, said first and second bevel gears engaging each other.

12. The table saw machine as defined in claim 9, wherein said second operating switch is serially connected in one of said second and third lines, and said rotational shaft of said regulating motor is driven to rotate in the second direction when said first operating switch is open-circuit and said second operating switch is short-circuit.

13. The table saw machine as defined in claim 9, wherein said power-supply module comprises an AC power, a transformer, and a rectifier, said transformer having a primary side having two ends connecting with said AC power and a secondary side having two ends connecting with said rectifier.

14. The table saw machine as defined in claim 13, wherein said rectifier is a bridge rectifier.

15. The table saw machine as defined in claim 13, wherein said changeover mechanism has a relay for switching said first NC, second NC, first NO, and second NO switches.

16. The table saw machine as defined in claim 15, wherein said first operating switch serially connects with said relay.

17. The table saw machine as defined in claim 16, wherein said relay is connected in parallel with said AC power and said transformer.

18. The table saw machine as defined in claim 9, wherein said saw motor is connected in parallel with said AC power and said transformer.

19. The table saw machine as defined in claim 18, wherein said control device further comprises a pair of linked switches, one of which controls the start of said saw motor and the other of which controls the start of said regulating motor, and said linked switches being contrary to each other in switch.

* * * * *